United States Patent
Destenaves

(10) Patent No.: US 10,637,280 B2
(45) Date of Patent: Apr. 28, 2020

(54) POWER SUPPLY SYSTEM AND METHOD FOR A MOBILE MEDICAL WORKSTATION

(71) Applicant: Acumentrics, Inc., Walpole, MA (US)

(72) Inventor: Yves Destenaves, Kingston, MA (US)

(73) Assignee: Acumentrics, Inc., Walpole, MA (US)

( * ) Notice: Subject to any disclaimer, the term of this patent is extended or adjusted under 35 U.S.C. 154(b) by 149 days.

(21) Appl. No.: 15/892,649

(22) Filed: Feb. 9, 2018

(65) Prior Publication Data

US 2018/0233948 A1 Aug. 16, 2018

Related U.S. Application Data

(60) Provisional application No. 62/459,177, filed on Feb. 15, 2017.

(51) Int. Cl.
| | |
|---|---|
| *G06F 1/26* | (2006.01) |
| *H02J 9/06* | (2006.01) |
| *H02J 7/00* | (2006.01) |
| *G06F 1/16* | (2006.01) |
| *G06F 1/3203* | (2019.01) |

(52) U.S. Cl.
CPC ............ *H02J 9/061* (2013.01); *G06F 1/1635* (2013.01); *G06F 1/1656* (2013.01); *G06F 1/263* (2013.01); *H02J 7/0068* (2013.01); *G06F 1/3203* (2013.01)

(58) Field of Classification Search
CPC ......... H02J 9/061; H02J 7/0068; G06F 1/263; G06F 1/1656; G06F 1/1635
USPC ....................................................... 713/300
See application file for complete search history.

(56) References Cited

U.S. PATENT DOCUMENTS

| | | | | |
|---|---|---|---|---|
| 5,615,129 | A * | 3/1997 | Stich ...................... | G04C 10/00 307/66 |
| 6,493,217 | B1 * | 12/2002 | Jenkins, Jr. ............ | A47B 21/00 108/147 |
| 9,680,333 | B1 * | 6/2017 | Brooks .................. | A61B 90/37 |
| 2002/0050805 | A1 * | 5/2002 | Petrovic ............... | H02J 7/0093 320/130 |
| 2006/0076921 | A1 * | 4/2006 | Kubota ................. | H02J 7/0072 320/107 |
| 2009/0033276 | A1 * | 2/2009 | Ishii ...................... | H02J 7/0073 320/103 |
| 2009/0212738 | A1 * | 8/2009 | Coonan ................. | H02J 7/0027 320/113 |
| 2009/0212744 | A1 * | 8/2009 | Werthman ........... | A61B 5/0002 320/162 |
| 2009/0261656 | A1 * | 10/2009 | Coonan ..................... | G06F 1/16 307/80 |
| 2009/0268385 | A1 | 10/2009 | Harbin et al. | |
| 2010/0088843 | A1 * | 4/2010 | Reed ..................... | A47L 9/2857 15/389 |
| 2010/0264738 | A1 | 10/2010 | Murtha et al. | |

(Continued)

*Primary Examiner* — Volvick Derose
(74) *Attorney, Agent, or Firm* — Price Heneveld LLP

(57) ABSTRACT

A power supply system and method for a mobile medical workstation are provided herein. A charger is configured to receive AC input from a mains power source and generate a DC output. A battery is configured to be charged by the DC output. The battery is further configured to supply electrical power to a computing device of the mobile medical workstation when the charger is disconnected from the mains power source. The ratio of a runtime of the battery to a charge time of the battery is at least 30 to 1.

17 Claims, 3 Drawing Sheets

(56) References Cited

U.S. PATENT DOCUMENTS

| | | | |
|---|---|---|---|
| 2014/0167506 A1* | 6/2014 | Wood | H02J 7/0014 |
| | | | 307/25 |
| 2015/0188324 A1* | 7/2015 | Nicholson | H02J 7/0077 |
| | | | 320/107 |
| 2015/0288199 A1* | 10/2015 | Bui-Van | B60L 3/0046 |
| | | | 320/118 |

* cited by examiner

POWER SUPPLY SYSTEM AND METHOD FOR A MOBILE MEDICAL WORKSTATION

CROSS-REFERENCE TO RELATED APPLICATION

This application claims priority to U.S. Provisional Application No. 62/459,177, filed on Feb. 15, 2017, entitled "POWER SUPPLY SYSTEM AND METHOD FOR A MOBILE MEDICAL WORKSTATION," the entire disclosure of which is hereby incorporated by reference.

FIELD OF THE INVENTION

The present invention generally relates to mobile medical workstations used in health care settings, and more particularly, mobile medical workstations employing power supply systems.

BACKGROUND OF THE INVENTION

Mobile medical workstations, also known as "computers on wheels" or "workstations on wheels," are increasing in popularity with the merger between healthcare and information technology. These workstations typically include a computing device such as a computer, laptop, or the like, that enables a medical professional or other user to perform a variety of functions such as accessing and recording patient information. The computing device is typically powered by a rechargeable battery of a lead acid, lithium ion, or nickel-metal hydride variety. Unfortunately, current battery solutions oftentimes require frequent charging and replacement, and are usually accompanied by a high total cost of ownership.

In instances where a battery undergoes a lengthy charge cycle or requires replacement, the associated computing device, and the workstation by extension, is rendered immobile or unusable for long periods of time. If no other workstations are available, the medical professional is forced to manually gather patient information and enter the same at a later time, for example. Such interruptions are not only frustrating to the medical professional, but may lead to clerical errors that adversely impact patient care. In view of these drawbacks, there is a need for a battery solution that benefits from short charge cycles, has a long shelf life, and provides a lower total cost of ownership.

SUMMARY OF THE INVENTION

According to one aspect of the present invention, a power supply system for a mobile medical workstation is provided. A charger is configured to receive AC input from a mains power source and generate a DC output. A battery is configured to be charged by the DC output. The battery is further configured to supply electrical power to a computing device of the mobile medical workstation when the charger is disconnected from the mains power source. The ratio of a runtime of the battery to a charge time of the battery is at least 30 to 1.

According to another aspect of the present invention, a mobile medical workstation is provided. The workstation includes a wheel assembly, a support member extending vertically from the wheel assembly, a computing device coupled to the support member, and a power supply system. The power supply system includes a charger configured to receive AC input from a mains power source and generate a DC output. The power supply also includes a battery configured to be charged by the DC output. The battery is further configured to supply electrical power to the computing device when the charger is disconnected from the mains power source. The ratio of a runtime of the battery to a charge time of the battery is at least 30 to 1.

According to another aspect of the present invention, a power supply method for a mobile medical workstation is provided. The method includes the steps of connecting a charger to a mains power source supplying an AC input; using the charger to generate a DC output from the AC input; charging a battery with the generated DC output; disconnecting the charger from the mains power source; and using the battery to supply electrical power to a computing device of the mobile medical workstation, wherein the ratio of a runtime of the battery to a charge time of the battery is at least 30 to 1.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
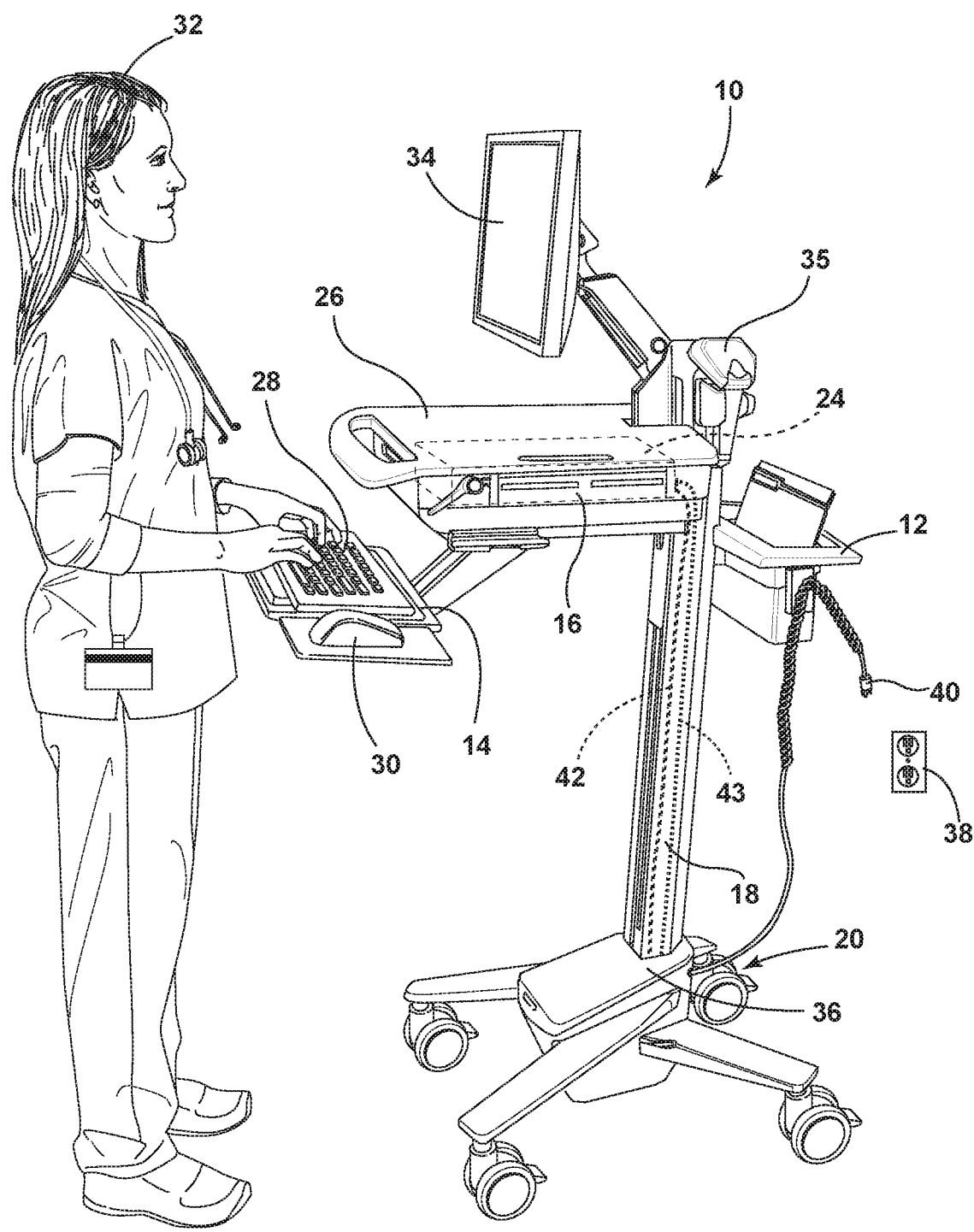
FIG. 1 is a perspective view of a mobile medical workstation being used by a medical professional, wherein a power supply system is provided for supplying electrical power to a computing device of the mobile medical workstation.

Referring to FIG. 1, reference numeral 10 generally designates a mobile medical workstation. The workstation 10 may include a first storage compartment 12, a retractable support surface 14, and a second storage compartment 16. The forgoing components are coupled to an adjustable support member 18 extending vertically from a wheel assembly 20. The first storage compartment 12 is configured to house medication, medical supplies, medical devices, and/or other objects or devices commonly used in the health field. The second storage compartment 16 is configured to house a computing device 24 such as a laptop, tablet, and the like, and includes a top surface 26 configured as an antimicrobial work surface. A keyboard 28 and a mouse 30 are operably coupled to the computing device 24 and are disposed atop the retractable support surface 14 to enable a medical professional 32 or other user to input information or otherwise communicate with the computing device 24. Data from the computing device 24 is displayed on a monitor 34 operably coupled to the computing device 24 and disposed at an upper extent of the support member 18. The computing device 24 may also be operably coupled to other electronic devices such as an RFID reader 35 or other medical instrument commonly associated with mobile medical workstations.

The computing device 24 is supplied electrical power by a power supply system 36 exemplarily shown as a modular unit coupled to the wheel assembly 20. In alternative embodiments, the power supply system 36 may be coupled to the support member 18 or otherwise provided. The power supply system 36 is configured to supply electrical power to the computing device 24 when the power supply system 36 is connected to a mains power source (e.g., wall outlet 38) via an electrical connector 40 and is configured as an uninterruptible power supply (UPS) that provides electrical power to the computing device 24 when the power supply system 36 is disconnected from the mains power source (e.g., unplugging the electrical connector 40). The power supply system 36 is configured to communicate with the computing device 24 via a USB connection 42 and supplies electrical power to the computing device 24 via an AC connection 43.

Figure 2:
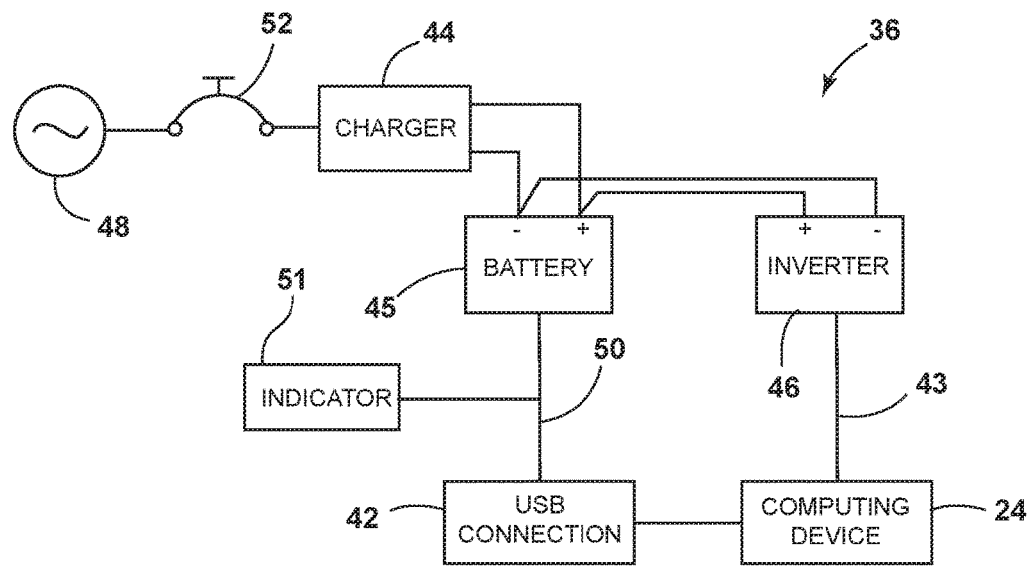
FIG. 2 is a block circuit diagram of the power supply system shown in FIG. 1.

Referring to FIG. 2, the power supply system 36 is shown according to one embodiment. The power supply system 36 includes a charger 44, a battery 45, and an inverter 46. During a charging cycle, the power supply system 36 is connected to a mains power source 48 and the charger 44 converts AC input supplied by the mains power source 48 into DC output used to charge the battery 45. The inverter 40 is operably coupled to the battery 45 and is configured to convert DC output power from the battery 45 into AC input power that is supplied to the computing device 24 when the power supply system 36 is disconnected from the mains power source 48. The AC input power is supplied to the computing device 24 via the AC connection 43. A system management bus (SMBus) 50 is connected to the battery 45 to enable communication between the battery 45 and the computing device 24 via the USB connection 42. An indicator 51 is optionally coupled to the SMBus 50 and is configured to illuminate in one or more colors and/or patterns to indicate the state of charge (SOC) of the battery 45 and/or other battery related information. While not shown, it is contemplated that the SMBus 50 may also be connected to the charger 44 and/or inverter 46 to enable the same to communicate with the computing device 24.

In the depicted embodiment, the mains power source 48 may correspond to wall outlet 38 and supplies an AC input rated at 115 volts (V), 15 amps (A), and 1500 watts (W), as is common in health care settings in the United States. The charger 44 has a specific power density equal to or greater than 560 watts per liter (W/L) and is configured to receive AC input supplied from the mains power source 48 and generate a DC output rated at 14.4V, 100 A, and 1500 W. A circuit breaker 52 having an amperage rating of 20A may be optionally provided between the charger 44 and the mains power source 48 and is configured to interrupt current flow if a fault is detected to prevent damage to the charger 44 and other components of the power supply system 36.

Figure 3:
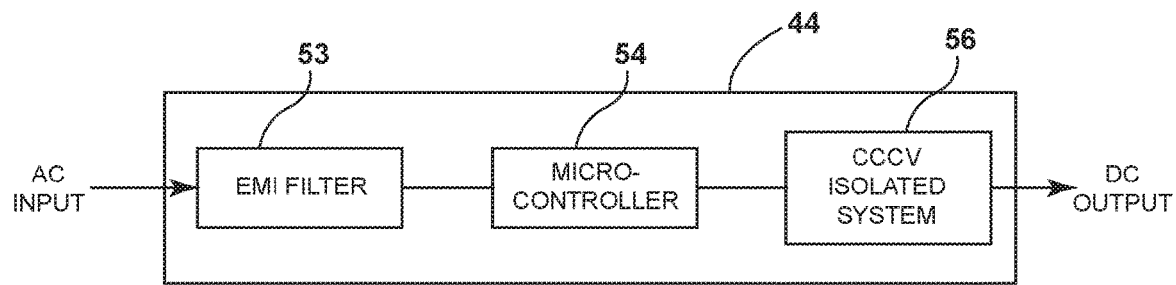
FIG. 3 is a block circuit diagram illustrating one embodiment of a charger used in the power supply system shown in FIGS. 1 and 2.

As shown in FIG. 3, the charger 44 includes an electromagnetic interference (EMI) filter 53, a microcontroller 54, and a constant current and constant voltage (CCCV) isolated system 56 connected in series. The EMI filter 53 is configured to suppress interference present on AC input received from the mains power source 48. The microcontroller 54 is electrically coupled to the EMI filter 53 and is configured to convert filtered AC input into DC output with a power factor correction (PFC) applied thereto. The CCCV isolated system 56 is electrically coupled to the microcontroller 54 and is configured to deliver the DC output rated at 14.4V, 100 A, and 1500 W.

Referring back to FIG. 2, the charger 44 is electrically coupled to a positive terminal and a negative terminal of the battery 45. The positive and negative terminals of the battery 45 are electrically coupled to corresponding positive and negative terminals of the inverter 40, which is configured with a 2 AC output. The battery 45 is configured as a lithium iron phosphate (LFP) battery having a volume of less than 4.7 cubic liters and a battery capacity of at least 35 amp hours (Ah). In such a configuration, the battery 45 is capable of being charged from zero to full SOC in approximately 20 minutes at a 3C charge rate (105 amps). As such, the time in which to charge the battery 45 is significantly lessened when compared to existing solutions typically requiring charge times in excess of several hours.

With respect to the depicted embodiment, the battery 45 has a maximum output energy equal to or greater than 460 watt hours (Wh) and is configured to output a minimum of 46 W electrical power that is converted by the inverter 40 and supplied to the computing device 24 via the AC connection 43. Thus, on a full charge taking approximately 20 minutes, the battery 45 has a runtime lasting approximately 10 hours. When time is of the essence, a 2 minute charge delivers a runtime of approximately 1 hour. Accordingly, when the battery 45 is outputting the minimum 46 W electrical power, it will be appreciated that the ratio of the runtime of the battery 45 to the charge time of the battery 45 is at least 30 to 1. Furthermore, since the battery 45 can be fully charged in approximately 20 minutes to deliver a runtime of approximately 10 hours, the battery 45 requires 1 hour or less of total downtime in which to charge during a 24 hour cycle. Or in other words, the power supply system 36 may be disconnected from the mains power source 48 such that the computing device 24 is powered exclusively by the battery 45 for at least 23 hours daily. Given these favorable discharging properties, it is contemplated that the battery 45 may have a shelf life of over 7 years, even if operated daily with three charge cycles. When compared to existing solutions, typically having a cycle life of 4000 or less, the battery 45 provided herein greatly lessens the total cost of ownership.

Figure 4:
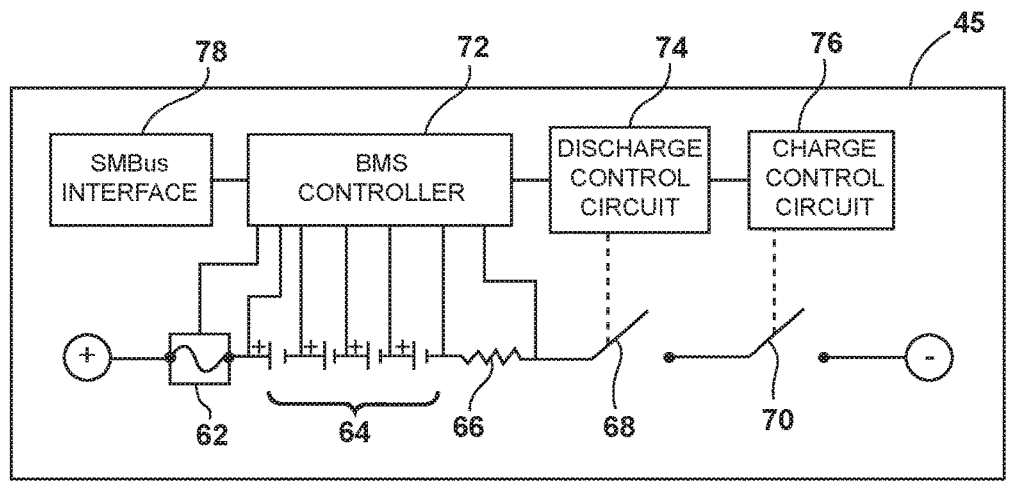
FIG. 4 is a block circuit diagram illustrating one embodiment of a rechargeable battery used in the power supply system shown in FIGS. 1 and 2.

As shown in FIG. 4, the battery 45 may include an electronic fuse 62, a number of LFP cells 64, a shunt 66, a discharge field-effect transistor(s) (FET(s)) 68, and a charge FET(s) 70 connected in series between the positive and negative terminals of the battery 45. A battery management system (BMS) controller 72 is electrically coupled to the fuse 62, the LFP cells 64, and the shunt 66, in addition to a discharge control circuitry 74 configured to operate FET(s) 68 and a charge control circuitry 76 configured to operate FET(s) 70. The BMS controller 72 is configured to manage, balance, and protect the battery 45 from unstable conditions. The BMS controller 72 communicates with the discharge control circuitry 74 and the charge control circuitry 76 to control both charging and discharging functions of the battery 45.

Additionally, the BMS controller 72 also communicates with a SMBus communication interface 78 to enable the battery 45 to provide operational parameters to the computing device 24 over the SMBus 50. The operational parameters include battery voltage, current, state of charge, state of discharge, charge time, discharge time, battery energy throughput, temperature of battery components, and the like. Such information may be displayed on the monitor 34 of the mobile medical workstation 10 and allows the medical professional 32 or other user to monitor the power supply system 36. Such information is particularly useful in notifying the medical professional 32 or other user when a charge cycle is needed or if an operational issue arises.

Further, it is contemplated that the SMBus communication interface 78 may receive communications from the computing device 24 over the SMBus 50. Such communications may include user-input supplied to the computing device 24 using the keyboard 28 and/or the mouse 30 to enable the medical professional 32 or other user to program specific parameters related to the battery 45 for the purposes of setting alarms, for example, or engaging in other functions related to the operation of the power supply system 36.

Figure 5:
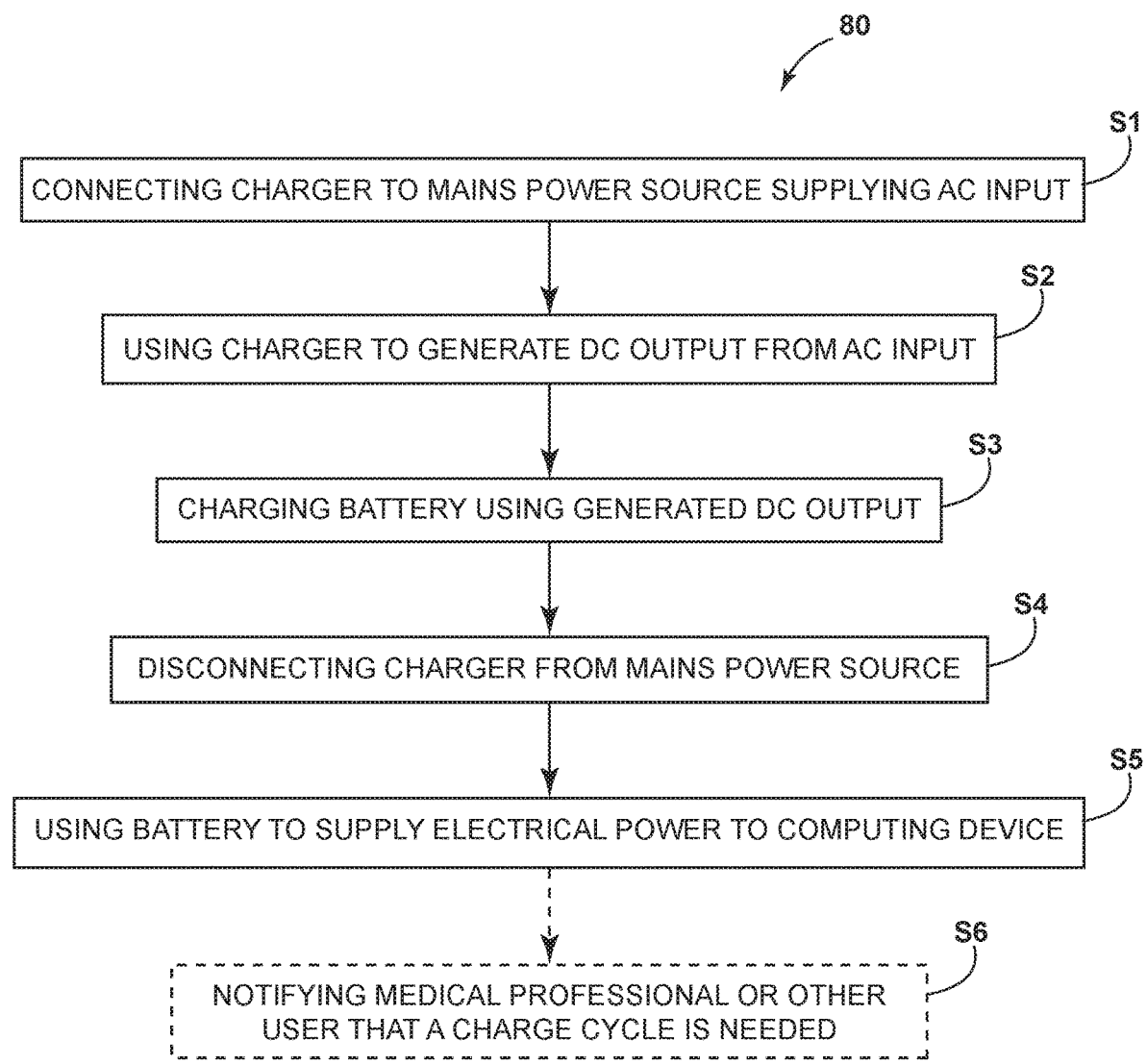
FIG. 5 is a power supply method for the mobile medical workstation implemented using the power supply system shown in FIGS. 1 and 2.

Referring to FIG. 5, a power supply method 80 is shown and will be described with reference to the power supply system 36 shown in FIGS. 1 and 2. As shown in FIG. 5, the power supply method 80 includes connecting the charger 44 to the mains power source 48 supplying AC input at step S1. At step S2, the charger 44 is used to generate a DC output from the AC input. As described herein, the charger 44 may have a specific power density equal to or greater than 560 watts per liter (W/L) and is configured to generate DC output rated at 14.4V, 100 A, and 1500 W. At step S3, the battery 45 is charged using the generated DC output from step S2. As described herein, the battery 45 may be configured as a LFP battery having a volume of less than 4.7 cubic liters and a battery capacity of at least 35 amp hours (Ah). In such a configuration, the battery 45 is capable of being charged from zero to full SOC in approximately 20 minutes at a 3C charge rate (105 amps). If a shorter charging cycle is desired, the battery 45 is capable of delivering a 1 hour run time per 2 minutes of charge time.

Once the medical professional 32 or other user deems that the battery 45 has been sufficiently charged, the charger 44 is disconnected from the mains power source 48 at step S4 and the battery 45 is used to supply electrical power to the computing device 24 of the mobile medical workstation 10 at step S5. As described herein, the battery 45 may be charged from zero to full SOC in approximately 20 minutes and have a runtime of approximately 10 hours on a full charge. Accordingly, the ratio of the runtime of the battery 45 to the charge time of the battery 45 is at least 30 to 1. At step S6, the power supply system 36 may optionally notify the medical professional 32 or other user that a charge cycle is needed. As described herein, the notification may be displayed on the monitor 34 and/or provided by indicator 51.

Given that the battery 45 only requires 20 minutes to be charged from zero to full SOC and has a runtime of approximately 10 hours on a full charge, the battery 45 only requires at most three charge cycles during a 24 hour cycle. Since the charge cycles total an hour or less, the mobile medical workstation 10 may be used independently of the mains power source 48 for at least 23 hours daily without fear of losing power to the computing device 24. This is particularly beneficial in health care settings where a mains power source is not always available or readily accessible. By virtue of the battery 45 having a long runtime and short charge time, the medical professional 32 or other user may freely use the mobile medical workstation 10 without having to overly rely on the availability of a mains power source.

Accordingly, a power supply system and method for a mobile medical workstation have been advantageously provided herein. By utilizing the power supply system and method described herein, a computing device of the mobile medical workstation is supplied continuous electrical power from a rechargeable battery for greater periods of time per charge cycle. Compared to existing solutions, the battery benefits from a short charge cycle, a long runtime, and a long shelf life, thereby decreasing the total cost of ownership of the power supply system as a whole. As such, when the power supply system and method are employed in a health care setting, the mobile medical workstation and associated computing device each benefit from increased uptime in the absence of a mains power source.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A power supply system for a mobile medical workstation, comprising:
    a charger configured to receive AC input from a mains power source and generate a DC output, wherein the charger has a specific power density equal to or greater than 560 watts per liter; and
    a lithium iron phosphate battery configured to be charged by the DC output, wherein the battery is further configured to supply electrical power to a computing device of the mobile medical workstation when the charger is disconnected from the mains power source, and wherein the ratio of a runtime of the battery to a charge time of the battery is at least 30 to 1 such that a 2 minute charge time delivers a runtime of at least approximately 1 hour, wherein the lithium iron phosphate battery has a volume of less than 4.7 cubic liters and a maximum output energy equal to or greater than 460 watt hours.

2. The power supply system as claimed in claim 1, wherein the DC output generated by the charger is rated at 14.4 volts, 100 amps, and 1500 watts.

3. The power supply system as claimed in claim 1, wherein the lithium iron phosphate battery has a battery capacity of at least 35 amp hours.

4. The power supply system as claimed in claim 1, wherein the battery is configured to be charged from zero to full state of charge in approximately 20 minutes.

5. The power supply system as claimed in claim 1, wherein the battery is configured to output a minimum of 46 watt electrical power.

6. The power supply system as claimed in claim 1, wherein the charger is disconnected from the mains power source such that the computing device is powered exclusively by the battery for at least 23 hours daily.

7. A mobile medical workstation comprising:
    a wheel assembly;
    a support member extending vertically from the wheel assembly;
    a computing device coupled to the support member; and
    a power supply system comprising:
        a charger configured to receive AC input from a mains power source and generate a DC output, wherein the charger has a specific power density equal to or greater than 560 watts per liter; and
        a lithium iron phosphate battery configured to be charged by the DC output, wherein the battery is further configured to supply electrical power to the computing device when the charger is disconnected from the mains power source, and wherein the ratio of a runtime of the battery to a charge time of the battery is at least 30 to 1 such that a 2 minute charge time delivers a runtime of at least approximately 1 hour, wherein the lithium iron phosphate battery has a volume of less than 4.7 cubic liters and a maximum output energy equal to or greater than 460 watt hours.

8. The power supply system as claimed in claim 7, wherein the DC output generated by the charger is rated at 14.4 volts, 100 amps, and 1500 watts.

9. The power supply system as claimed in claim 7, wherein the lithium iron phosphate battery has a volume of less than 4.7 cubic liters and a battery capacity of at least 35 amp hours.

10. The power supply system as claimed in claim 7, wherein the battery is configured to be charged from zero to full state of charge in approximately 20 minutes at a charge rate of 3C, and wherein the battery has a runtime of approximately 10 hours on a full charge.

11. The power supply system as claimed in claim 7, wherein the battery is configured to output a minimum of 46 watt electrical power.

12. The power supply system as claimed in claim 7, wherein the charger is disconnected from the mains power source such that the computing device is powered exclusively by the battery for at least 23 hours daily.

13. A power supply method for a mobile medical workstation, comprising the steps of:
    connecting a charger to a mains power source supplying an AC input, wherein the charger has a specific power density equal at or greater than 560 watts per liter;
    using the charger to generate a DC output from the AC input;
    charging a lithium iron phosphate battery with the generated DC output;
    disconnecting the charger from the mains power source; and
    using the battery to supply electrical power to a computing device of the mobile medical workstation, wherein the ratio of a runtime of the battery to a charge time of the battery is at least 30 to 1 such that a 2 minute charge time delivers a runtime of at least approximately 1 hour, wherein the lithium iron phosphate battery has a volume of less than 4.7 cubic liters and a maximum output energy equal to or greater than 460 watt hours.

14. The power supply method as claimed in claim 13, wherein the DC output generated by the charger is rated at 14.4 volts, 100 amps, and 1500 watts.

15. The power supply method as claimed in claim 13, wherein the lithium iron phosphate battery has a volume of less than 4.7 cubic liters and a battery capacity of at least 35 amp hours.

16. The power supply method as claimed in claim 13, wherein the battery is configured to be charged from zero to full state of charge in approximately 20 minutes.

17. The power supply method as claimed in claim 13, wherein the battery has a maximum output energy equal to or greater than 460 watt hours and is configured to output a minimum of 46 watt electrical power.

* * * * *